June 18, 1946.  J. E. BEVINS  2,402,360
INSTRUMENT CASE
Filed Dec. 5, 1942
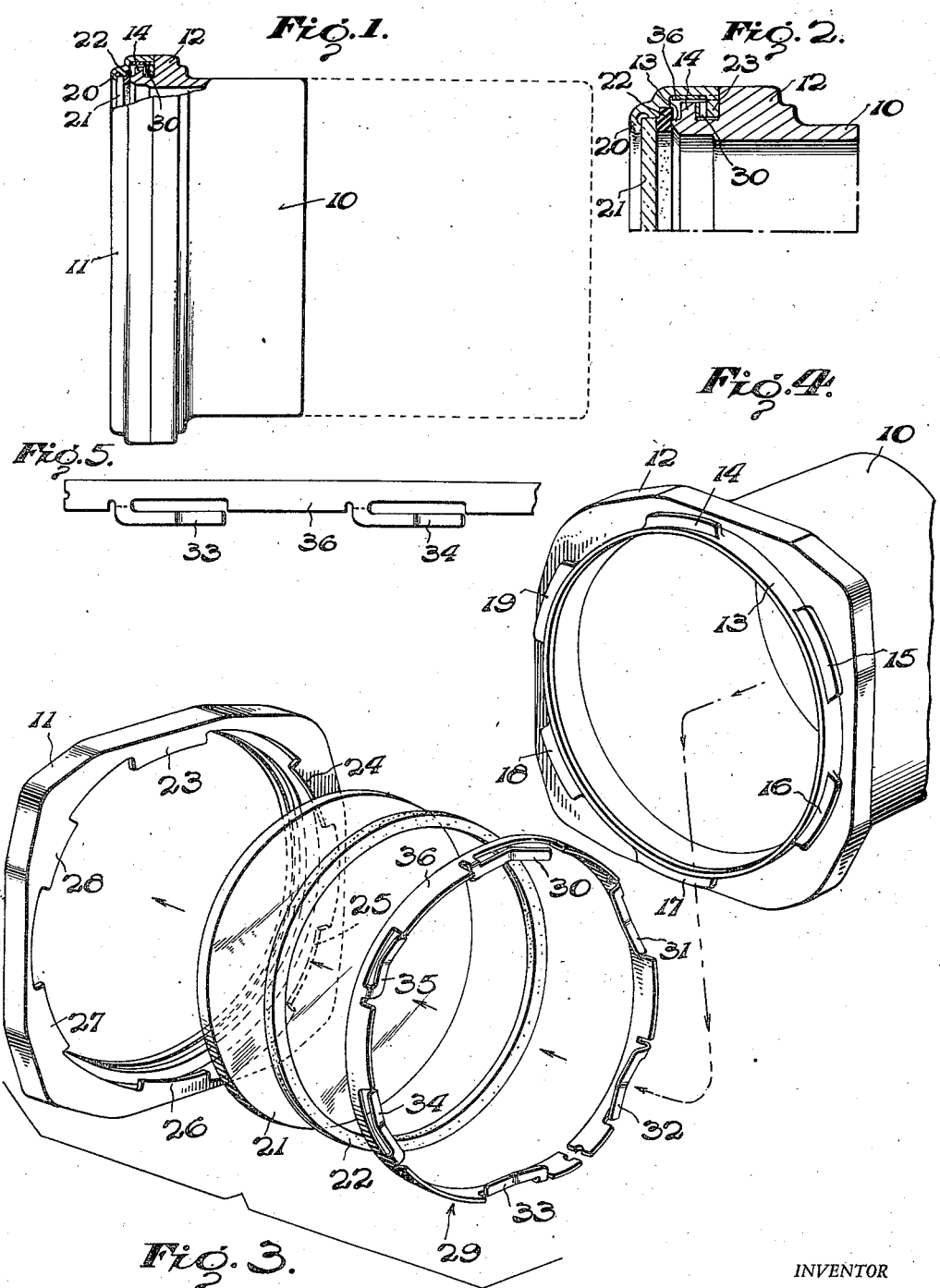
INVENTOR
James E. Bevins.
BY
ATTORNEY Patented June 18, 1946

2,402,360

UNITED STATES PATENT OFFICE 2,402,360

INSTRUMENT CASE

James E. Bevins, Ardmore, Pa., assignor to Bendix Aviation Corporation, Bendix, N. J., a corporation of Delaware Application December 5, 1942, Serial No. 468,015

4 Claims. (Cl. 220—82)

This invention relates to instrument housings or cases adapted for use with pressure actuated instruments, such as, for example, altimeters, airspeed indicators, manifold pressure gauges, rate of climb devices and the like and, more particularly, to closure means for rapidly assembling and/or disassembling such housings or cases.

Instrument housings or cases, heretofore provided in the art, for supporting the operative mechanisms of various instruments, together with their dials and indicators, have been provided with bezels or other expedients for sealably closing the open ends thereof. Numerous and undesirable disadvantages developed with the use of known devices. For example, the use of bezels necessitated the provision of a plurality of tapped holes passing through both the bezels and cases for the reception of a plurality of screws so that their assembly was time consuming. In some instances the cases were provided with screw threads at their outer peripheries for the reception of internally threaded bezels. The construction of the latter expedient required time consuming precision work and, furthermore, the expedient itself proved undesirable for the reason that during relatively great temperature changes, the threads would crack preventing a sealable closure for the instrument mechanism without a complete remachining of the case and bezel or a substitution of a new case and bezel. In other instances, cases were designed to be closed without the use of bezels. In the latter situation, the front ends of the cases were grooved for the reception of a cover glass held in place by an exteriorly arranged split snap ring. Oftentimes, an attempt to disassemble such an arrangement resulted in destruction of the ring.

The present invention has, as one of its objects, the provision of novel and rapid closing or locking means for instrument cases with the use of which the foregoing disadvantages are overcome.

Another object of the present invention is to provide a novel quick closing device or coupling for instrument cases with the use of which an airtight seal is obtained.

A further object of the invention is to provide a novel and quick closing bezel for an instrument case with the use of which the provision of screw threads, the use of screws, the tapping of suitable holes therefor and the expenditure of excessive time have all been eliminated.

Another object of the invention is to provide a novel bezel for an instrument case which requires but a minor angular twist or turning motion for accomplishing a sealable assembly.

A further object of the invention is to provide a novel instrument housing assembly having a resilient member interposed between the bezel and the case thereof for sealably urging the bezel against the case.

Another object of the invention is to provide a new and novel manner of rapidly and sealably assembling instrument housings.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not designed as a definition of the limits of the invention.

In the drawing, wherein like reference characters refer to like parts throughout the several views, Figure 1 is a side elevation view, partially in section, of one form of an assembled instrument housing embodying the subject matter of the present invention;

Figure 2 is an enlarged fragmentary and sectional showing of a portion of the structure of Figure 1;

Figure 3 is an exploded perspective view of the novel bezel assembly of the present invention;

Figure 4 is a perspective view of the novel case of the present invention adapted for locking by the bezel assembly of Figure 3; and, Figure 5 is a plan view of a blank from which an element of the bezel assembly of Figure 3 is formed.

The novel instrument housing assembly of the present invention comprises a suitable case and bezel, each of which is provided with a corresponding number of peripheral lugs adapted for interlocking or interleaving with one another, together with a series of leaf springs corresponding in number to the lugs on the bezel and case so that upon interleaving of the bezel lugs with the case lugs, each of the leaf springs is arranged between a corresponding bezel and case lug to urge them apart so that the bezel is thereby sealably urged into engagement with the case.

Referring now to the drawing, and more particularly to Figure 1 thereof, for a more detailed description of the present invention, the novel instrument housing assembly thereof comprises a suitable cylindrical case 10, having its open end closed by a bezel 11 in a novel manner, and provided in proximity to its open end with a flange 12 adapting the assembly for mounting on an instrument panel or the like.

As more clearly shown in Figure 4, case 10 is provided with an extended annular shoulder 13 between flange 12 and its open or front end and mounted on the shoulder or formed integrally therewith are a series (preferably six in number) of equally spaced peripheral lugs 14, 15, 16, 17, 18 and 19. The lugs are so arranged that ample clearance is provided between the inner side of the lugs and the outer side of flange 12 for a purpose to presently appear.

Bezel 11, at its front end, is provided with an annular abutment 20 for supporting a suitable cover glass 21 therein. Furthermore, a circumferential groove is formed within the bezel for the reception of an annular resilient sealing ring 22 which, at one side, abuts cover glass 21 and at its other side sealably abuts the outer edge of case shoulder 13, which may have its outer edge reduced in size as shown in Figure 2, when the bezel and case are assembled. The inner end of the bezel is provided with a series of lugs 23, 24, 25, 26, 27 and 28, corresponding in number to the number of lugs on case 10.

The bezel lugs are so constructed that they are adapted for interlocking or interleaving with the case lugs, that is, when the bezel and case are to be assembled bezel lug 23 will be inserted between case lugs 19, 14 and moved to rest behind case lug 14, bezel lug 28 will be inserted between case lugs 14, 15 and moved to rest behind case lug 15, etc. When such interleaving of the corresponding lugs is effected there will be an endwise clearance between the bezel and case so that the two parts alone will not constitute an airtight seal. To this end, i. e., to take up the clearance between corresponding bezel and case lugs together with effecting a sealtight closure for the assembly, a spring of special design, generally designated with reference character 29, is arranged within the bezel.

The interior of the bezel, adjacent the inner faces of the bezel lugs, is provided with an annular groove for accommodating spring 29 therein. The spring, formed of suitable material, such as copper beryllium, for example, is, initially, in the form of flat strip stock from which blanks are severed (Figure 5). The blank is stamped in a suitable manner to provide a series of leaf springs 30, 31, 32, 33, 34, and 35 which are bent at an angle of 90° relative to the blank, the latter being subsequently bent to form an annular split ring 36. Each leaf spring is provided at its center with a transverse bend defining an apex in the manner illustrated in Figure 3. The number of leaf springs carried by ring 36 corresponds to the number of lugs on the bezel and case.

In assembling bezel 11, cover glass 21 is inserted therein followed by sealing ring 22. Thereafter, annular split ring 36 is inserted within the bezel with each leaf spring positioned immediately behind a corresponding bezel lug, i. e., leaf spring 30 will be directly behind bezel lug 23, leaf spring 31 directly behind bezel lug 24, etc. The outwardly bent portion or apex of each leaf spring lies in a direction away from the bezel lugs.

With the bezel unit assembled as described, the bezel is placed against the open end of case 10 in such a manner that bezel lug 23 rests between case lugs 19, 14; bezel lug 28 between case lugs 14, 15; etc. Subsequently bezel 11 is turned angularly to the right about 30° so that bezel lug 23 passes behind case lug 14 with leaf spring 30 located therebetween; bezel lug 28 directly behind case lug 15 with leaf spring 35 located therebetween; etc.

With the bezel and case lugs interleaved in the foregoing manner, the outwardly bent central portion or apex of each of the leaf springs is brought to bear against corresponding case lugs. The springs, upon interleaving of the lugs, are compressed so that the outer ends of each leaf spring bear upon corresponding bezel lugs, urging the bezel against the case and at the same time compressing sealing ring 22 against the annular case shoulder 13 to provide a seal tight closure for the instrument case. Where previously, and without the interposition of ring 36 and its leaf springs, a certain clearance existed between the bezel and case lugs upon their interleaving, the clearance is taken up by virtue of the fact that each leaf spring forces a corresponding bezel lug away from a corresponding case lug whereby the bezel is held firmly against the case and an airtight seal is provided for the assembly.

The leaf springs as a whole constitute a powerful spring assembly which is designed to urge the bezel into sealing engagement with the case with a locking force of some ninety pounds. It will now be apparent that a new and novel, as well as desirable, coupling has been provided for interlocking the bezels and cases of instrument housings with the use of which but a minimum amount of time and effort is required.

In order to assemble the case, as already described, the bezel is placed upon the open end of the case and twisted about one-twelfth of a revolution whereby the respective bezel and case lugs are aligned or interleaved and simultaneously urged apart by the leaf springs. To disassemble the instrument housing, the bezel is simply twisted in a reverse direction one-twelfth of a revolution relative to the case at which time it is readily removable therefrom.

Although but one embodiment of the invention has been illustrated and described, various changes and modifications in the form and relative arrangement of parts, which will now appear to those skilled in the art, may be made without departing from the scope of the invention. Reference is therefore to be had to the appended claims for a definition of the limits of the invention.

I claim:

1. A casing provided with an open end and adapted for supporting an instrument mechanism therein, a bezel adapted for supporting a cover glass and a sealing ring therein for closing the open end of said casing, a series of projections on said casing, a series of projections on said bezel adapted to interleave with the projections on said casing, spring means between both series of said projections for urging the bezel and the sealing ring against said casing when one series of said projections is interleaved with the other series of said projections, and a split resilient ring carried by said bezel between the projections thereof and said sealing ring and supporting said spring means thereon.

2. A container provided with an open end, a cover provided with a sealing ring for sealably closing the open end of said container, a series of lugs on said container, a series of lugs on said cover adapted to interleave with the lugs on said container, a series of leaf springs between both series of said lugs for urging the cover and sealing ring against said container to provide an airtight closure for said container when one series of lugs is interleaved with the other series of said lugs, and a split resilient ring carried by said cover between the lugs thereof and said sealing ring and having said springs formed integrally therewith.

3. A substantially cylindrical casing provided with an open end, a cover adapted for supporting a cover glass and a sealing ring therein for closing the open end of said casing, a series of peripherally spaced lugs on said casing, a series of peripherally spaced lugs on said cover adapted to interleave with the casing lugs, a split substantially annular resilient member carried by said cover between the lugs thereof and said sealing ring, and a series of leaf springs formed on said annular member, said springs resting between both series of said lugs for urging said cover, cover glass, and sealing ring against said casing to provide an airtight closure for said casing when one series of lugs is interleaved with the other series of said lugs.

4. A container provided with an open end, a cover provided with a sealing ring for sealably closing the open end of said container, a series of lugs on said container, a series of lugs on said cover adapted to interleave with the lugs on said container, a series of leaf springs between both series of said lugs for urging the cover and sealing ring against said container to provide an airtight closure for said container when one series of lugs is interleaved with the other series of said lugs, and a split resilient ring carried by said cover between the lugs thereof and said sealing ring and supporting said spring means thereon.

JAMES E. BEVINS.